US008687957B2

(12) United States Patent
Perron (10) Patent No.: US 8,687,957 B2
(45) Date of Patent: Apr. 1, 2014

(54) METHOD AND APPARATUS FOR DERIVING PARAMETERS OF OPTICAL PATHS IN OPTICAL NETWORKS USING TWO-WAVELENGTH OTDR AND A WAVELENGTH-DEPENDENT REFLECTIVE ELEMENT

(75) Inventor: Stéphane Perron, Sainte-Hélène-de-Breakeyville (CA)

(73) Assignee: EXFO Inc., Quebec, QC (CA)

( * ) Notice: Subject to any disclaimer, the term of this patent is extended or adjusted under 35 U.S.C. 154(b) by 237 days.

(21) Appl. No.: 13/124,455

(22) PCT Filed: Oct. 19, 2009

(86) PCT No.: PCT/CA2009/001493
§ 371 (c)(1),
(2), (4) Date: Apr. 15, 2011

(87) PCT Pub. No.: WO2010/043056
PCT Pub. Date: Apr. 22, 2010

(65) Prior Publication Data
US 2012/0045205 A1 Feb. 23, 2012

Related U.S. Application Data (60) Provisional application No. 61/136,955, filed on Oct. 17, 2008.

(51) Int. Cl.
*H04B 17/00* (2006.01)
(52) U.S. Cl.
USPC .............................................. 398/25; 398/33
(58) Field of Classification Search
USPC ...................................................... 398/25, 33
See application file for complete search history.

(56) References Cited

U.S. PATENT DOCUMENTS 5,187,362 A    2/1993   Keeble
5,491,573 A * 2/1996   Shipley ........................... 398/13
(Continued)

FOREIGN PATENT DOCUMENTS

EP    1980834    10/2008
JP    02-176535    7/1990
(Continued)

OTHER PUBLICATIONS

Noriyuki Araki, Hisashi Izumita, Yusuke Koshikiya and Minoru Nakamura, High Spatial Resolution PON Measurement Using an OTDR Enhanced with a Dead-Zone-Free Signal Analysis Method; Proceedings SOFM 2004 Boulder CO. pp. 69-72.

(Continued)

*Primary Examiner* — Ken Vanderpuye
*Assistant Examiner* — Amritbir Sandhu (57) ABSTRACT

A method of distinguishing a wavelength-dependent reflective element (HRD) from wavelength-independent events in an optical network, the reflective element (HRD) being highly-reflective at a first predetermined wavelength ($\lambda_1$) and significantly less reflective at least one other predetermined wavelength ($\lambda_2$), comprising the steps of: connecting the wavelength-dependent reflective element (HRD) to said optical path at a first position, and, using an optical time domain reflectometer (22) connected to said optical path at a position remote from said reflective element, launching into said optical path light at said first wavelength ($\lambda_1$) and at said second wavelength ($\lambda_2$), detecting corresponding backreflected light from said optical paths and obtaining therefrom first and second OTDR traces (OTDR-$\lambda_1$, OTDR-$\lambda_2$) corresponding to said first ($\lambda_1$) and second ($\lambda_2$) wavelengths, respectively, of detected backreflected light as a function of optical distance from said point; comparing the first and second OTDR traces to distinguish a peak corresponding to said wavelength-dependent reflective element from peaks corresponding to said wavelength-independent reflective events; and outputting at least one parameter value of the distinguished peak as a measure of a parameter of said wavelength-dependent reflective element.

32 Claims, 6 Drawing Sheets

(56) References Cited

U.S. PATENT DOCUMENTS

| | | | |
|---|---|---|---|
| 5,491,574 A * | 2/1996 | Shipley | 398/13 |
| 5,754,284 A | 5/1998 | Leblanc et al. | |
| 5,771,250 A | 6/1998 | Shigehara et al. | |
| 6,310,702 B1 * | 10/2001 | Minami et al. | 398/13 |
| 6,512,610 B1 * | 1/2003 | Minami et al. | 398/21 |
| 6,650,840 B2 | 11/2003 | Feldman | |
| 6,708,004 B1 * | 3/2004 | Homsey | 398/177 |
| 6,980,287 B2 | 12/2005 | Renard et al. | |
| 7,042,559 B1 * | 5/2006 | Frigo et al. | 356/73.1 |
| 7,110,098 B2 | 9/2006 | Peerlings | |
| 7,206,478 B2 * | 4/2007 | Yeh | 385/24 |
| 7,280,189 B2 | 10/2007 | Weller | |
| 7,283,743 B2 | 10/2007 | Matz et al. | |
| 7,397,543 B2 | 7/2008 | Nebendahl | |
| 7,415,206 B1 * | 8/2008 | Birk et al. | 398/21 |
| 7,620,319 B2 * | 11/2009 | Krimmel | 398/33 |
| 7,684,699 B2 * | 3/2010 | Schmuck et al. | 398/33 |
| 7,894,362 B2 | 2/2011 | Effenberger | |
| 7,925,157 B2 * | 4/2011 | Xu et al. | 398/25 |
| 8,009,983 B2 * | 8/2011 | Zhang | 398/37 |
| 8,111,988 B1 * | 2/2012 | Schantz et al. | 398/34 |
| 8,270,828 B2 * | 9/2012 | Nakajima et al. | 398/28 |
| 8,290,363 B2 * | 10/2012 | Nakajima et al. | 398/13 |
| 8,290,364 B2 * | 10/2012 | Yang | 398/20 |
| 8,306,417 B2 * | 11/2012 | Chang et al. | 398/12 |
| 8,311,409 B2 * | 11/2012 | Chang et al. | 398/33 |
| 8,406,620 B2 * | 3/2013 | Khermosh et al. | 398/16 |
| 8,417,114 B1 * | 4/2013 | Storey et al. | 398/16 |
| 2004/0047269 A1 * | 3/2004 | Ikenaka et al. | 369/112.08 |
| 2006/0029390 A1 * | 2/2006 | Schmuck et al. | 398/33 |
| 2006/0051088 A1 | 3/2006 | Lee et al. | |
| 2007/0165978 A1 * | 7/2007 | Chen et al. | 385/12 |
| 2009/0232494 A1 * | 9/2009 | Hehmann et al. | 398/25 |
| 2009/0269054 A1 * | 10/2009 | Smith | 398/25 |
| 2010/0135653 A1 * | 6/2010 | Lee et al. | 398/25 |
| 2013/0088718 A1 * | 4/2013 | Perron et al. | 356/445 |

FOREIGN PATENT DOCUMENTS

| | | |
|---|---|---|
| JP | 2001-094512 | 4/2001 |
| JP | 2003254858 | 9/2003 |
| JP | 2003-309523 | 10/2003 |
| JP | 2005-091160 | 4/2005 |
| JP | 2005-140736 | 6/2005 |
| JP | 2001-066221 | 3/2011 |
| WO | WO2005003714 | 1/2005 |
| WO | WO2010076567 | 7/2010 |

OTHER PUBLICATIONS

Masahito Arii, Hisashi Izumita, Osamu Yamauchi: Recent Developments in Fiber Optics Maintenance System for Access Networks; NNT Access Network Service Systems Laboratories, NNT Corporation.

Enomoto, Y; Izumita, H; Nakamura, M. Over 31.5 dB Dynamic Range Optical Fiber Line Testing System with Optical Fiber Fault Isolation Function for 32 Branched PON; OFC 2003, vol. 2, pp. 608-609.

Serge-Andre Denis; Michel Leblanc Component Manufacturing and Return Loss Testing: OCWR vs Mandrel Free Technique, Application Note 161.

Yusuke Koshikiya Noriyuki Araki, Hisashi Izumita and Fumihiko Ito; Newly Developed Optical Fiber Line Testing System Employing Bi-Directional OTDRs for PON and In-Services Line Testing Criteria: IEICE Trans. Commun., vol. E90-B, No. 10, Oct. 2007, pp. 2793-2802.

Naoki Nakao, Hisashi Izumita, Takashi Inoue, Yoshitaka Enomoto, Noriyuki Araki and Nobuo Tomita;Maintenance Method Using 1650-nm Wavelength Band for Optical Fiber Cable Networks; Journal of Lightwave Technology, vol. 19, No. 10, Oct. 2001, pp. 1513-1520.

Nicholas Gagnon, EXFO Expertise Reaching Out OON 2007—Concordia U.

Koshikiya et al., "Simple and cost-effective fault location technique using bi-directional OTDR and in-service line testing criteria for PONs", 31st European Conference on Optical Communication, ECOC 2005, vol. 1, pp. 83-84, Sep. 25-29, 2005.

Yuksel et al., "Optical layer monitoring in Passive Optical Networks (PONs): A review", 10th Anniversary International Conference of Transparent Optical Networks, ICTON 2008, vol. 1, pp. 92-98, Jun. 22-26, 2008.

Caviglia et al., "Optical maintenance in PONs", 24th European Conference on Optical Communication, vol. 1, pp. 621-625, Sep. 20-24, 1998.

Wuilmart et al., "A PC-based method for the localisation and quantization of faults in passive tree-structured optical networks using the OTDR technique", IEEE Lasers and Electro-Optics Society Annual Meeting, LEOS 96, vol. 2, pp. 122-123, Nov. 18-19, 1996.

Laferriere et al., "Original method for analyzing multipaths networks by OTDR measurement", Optical Fiber communication Conference OFC 97, pp. 99-101, Feb. 16-21, 1997.

Lee et al., "Novel Fault Monitoring Scheme for PON systems using wavelength sweeper and interferometric devices", Joint conference of the Opto-Electronics and Communications Conference 2008 and the 2008 Australian Conference on Optical Fibre Technology OECC/ACOFT 2008, pp. 1-2, Jul. 7-10, 2008.

Masahito Arii, Hisashi Izumita, Osamu Yamauchi, "Recent Developments in Fiber Optics Maintenance System for Access Networks", Proceedings of ICEE Conference, 2005.

Serge-Andre Denis, Michel Leblanc, "Component Manufacturing and Return Loss Testing: OCWR vs. Mandrel-Free Technique", EXFO Application Note 161, May 2007.

* cited by examiner

FIGURE 1

* HRD-c (customer)

FIGURE 2

* Ideally consider IOR difference between two wavelength
** Ideally consider typical fiber attenuation difference between two wavelengths

FIGURE 3

Figure 3a – OTDR-λ1

Figure 3b – OTDR-λ2

*Ideally consider IOR difference between two wavelength
**Ideally consider typical fiber attenuation difference between two wavelengths

METHOD AND APPARATUS FOR DERIVING PARAMETERS OF OPTICAL PATHS IN OPTICAL NETWORKS USING TWO-WAVELENGTH OTDR AND A WAVELENGTH-DEPENDENT REFLECTIVE ELEMENT

CROSS-REFERENCE TO RELATED APPLICATIONS

This application claims priority from U.S. Provisional Patent Application No. 61/136,955 filed 17 Oct. 2008, the entire contents of which are incorporated herein by reference.

TECHNICAL FIELD

This invention relates to a method and apparatus for deriving one or more parameters of a selected optical path, e.g. a link, in an optical network using optical time domain reflectometry and at least one highly-reflective element associated with the selected optical path.

BACKGROUND ART

It is known for supervisory systems of point-to-point optical networks to use Optical Time Domain Reflectometer (OTDR) measurements to monitor optical links, specifically each joint (splices or connectors) in each link, to locate a fault when it occurs.

In point-to-multipoint optical networks, such as Passive Optical Networks (PON), however, respective ends of the network links are connected in common at the single point at or adjacent a network element (OLT) and, when in service, the opposite ends of the plurality of links (i.e., the multipoint ports) are each connected to a respective one of a plurality of optical network units (ONU). Consequently, classical OTDR measurements cannot be made from the common or single point to unambiguously characterize all or part of each link individually because the backreflected light from the different links will be summed together when detected at the common (single) point.

It has been known for some time to address this limitation by placing a reflective optical element at a demarcation point, this demarcation point being either at the customer end of the network link, or at some intermediate point "downstream" from the OLT beyond which the network service provider is not responsible for the fiber link to the customer ONU. The reflective element is generally highly reflective at an out-of-band wavelength reserved for testing (e.g. in the U band) and highly transmissive in the wavelength bands normally used for data-carrying optical signals. (See, for instance: Enomoto et al., "Over 31.5-dB dynamic range optical fiber line testing system with optical fiber fault isolation function for 32-branched PON", proceedings of Optical Fiber Communications Conference 2003, paper ThAA3; Koshikiya et al., "Newly developed optical fiber line testing system employing bi-directional OTDRs for PON and in-service line testing criteria", IEICE Transactions on Communications, Vol. E90-B, No. 10, October 2007 pp 2793-2802).

When short light pulses at this out-of-band testing wavelength are launched into the common point by the OTDR, each highly-reflective element produces a corresponding discernable "localized event", specifically a peak, in the resulting OTDR trace. The peak allows the position of the highly-reflective element to be determined, in terms of its optical distance from the common point, and, hence, the associated link to be identified based on predetermined knowledge (e.g. obtained during initial network commissioning, or during subsequent network expansion). Using this approach, the supervisory system can, in principle, qualitatively or quantitatively observe degradations in each optical path extending between the OTDR and the highly-reflective element by comparing the actual measurement of the peak to an initial baseline or reference level.

For convenience of description, hereinafter this technique of using reflective elements installed at such points along optical paths in the network will be described as "High Reflectance Demarcation" (HRD).

It has been proposed to measure the absolute loss of multipoint links in a passive optical network from the launching point of the OTDR to reflectors having known reflectance values at the end points of the multipoint links, using a reference reflectance of known value at the OTDR launch side. (See N. Gagnon (http://users.encs.concordia.ca/~bjaumard/Conferences_and_Seminars/OON_Workshops/OON_2007/Slides_OON_2007/OON_2007_EXFO_Gagnon.pdf, slides 15-17). Such an approach also bears similarity to that used in the IQS-12001B test system manufactured by EXFO Electro-Optical Engineering Inc. for testing fiber patchcords, as illustrated in FIG. 4 of EXFO Application Note 161. However, in the case of the IQS-12001B measurement procedure, it is the patchcord loss that is assumed known, thereby allowing the end reflectance to be calculated.

An OTDR means, for instance comprising a reference reflectance, suitable for use in such HRD applications, is described in U.S. Pat. No. 5,754,284 (Leblanc et al.), which is commonly owned with the present invention. More generally, however, any OTDR means comprising normalization means to measure the ratio of the detected backreflected pulse power to the launched pulsed power can be used for such measurements.

A drawback of the afore-described prior art methods is that the measured OTDR traces may also comprise localized events that arise from reflective events such as high splitter return loss, connectors, etc., in one or more of the optical paths that is/are not common with all the other optical paths (i.e. not in the F1 cable of a PON network, for instance). In general, the amplitudes of these strong localized events are approximately wavelength-independent. In the case where the point-to-multipoint network comprises two or more stages of splitting, a wavelength-independent reflective event before a second splitter may cause a localized event having an amplitude similar to that of a nearly 100% reflectance beyond the second splitter. It may be difficult to identify initially which localized reflective events are from reflective elements installed for HRD purposes and which localized reflective events are from other network reflective events. Initial characterization of the point-to-multipoint network before commissioning may then be difficult, and the measurement of optical path loss in a particular multipoint link may become unreliable.

It is desirable for the reflective element used for HRD to be highly-reflective, typically returning almost 100 percent of incident power, so as to improve peak detection accuracy and extend measurement range. A high reflectance (i) is more stable with respect to environmental changes, (ii) is generally easier to produce with tighter nominal reflectance tolerances, and (iii) reduces the probability that another localized event, such as a reflection from a wavelength-independent reflective artifact as mentioned hereinbefore, will have an amplitude similar to that generated by the reflective element. Unfortunately, however, the relatively large reflections from such a highly-reflective element may detract from OTDR measurements, such as the measurement of Rayleigh backscattering (RBS) of the optical path. (It should be noted that, for the case when one of the multipoint links has been identified as exhibiting a strong loss, e.g. due to a fiber break, etc., an RBS measurement can be very useful in determining the location of that loss, despite the presence of superposed RBS from the other non-damaged multipoint fibers in the OTDR traces. This is particularly true where the point-to-multipoint network comprises two levels of splitting and the break occurs after the first splitter "downstream" from the OLT.) More particularly, large OTDR peaks corresponding to strong reflections may be followed by long dead zones due to detector recovery time and "undershoots" if the receiver is only marginally stable, which limits OTDR spatial resolution. This reduces fiber fault localization capabilities of the system since what is shown on the OTDR trace is not really the fiber RBS signature. In addition, the necessarily strong attenuation of the portion of the OTDR pulses transmitted through this highly-reflective element will render the detection of RBS downstream from the HRD impractical.

Araki et al ("High spatial resolution PON measurement using an OTDR enhanced with a dead-zone-free signal analysis method", Symposium on Fiber Optics (SOFM04), Boulder Colo., September 2004, pp. 69-72) describe a method to overcome this dead zone problem, using an additional OTDR measurement taken "upstream" from the ONU. Also, in an article entitled "Newly Developed Optical Fiber Line testing System Employing Bi-Directional OTDRs for PON and In-Service Line testing Criteria", IEICE Trans. Commun., Vol. E90-B, No. 10 Oct. 2007, Koshikiya et al. describe a method of locating faults in each of the PON links by means of OTDRs operating bidirectionally each at a different wavelength, a common OTDR at the central office and an additional OTDR at each customer premises. Unfortunately, although these methods might be effective, they would be unduly costly for most commercial applications.

DISCLOSURE OF INVENTION

An object of the present invention is to mitigate the deficiencies of known methods of using OTDR and a reflective element to derive one or more parameters of an optical path or the reflective element in an optical network; or at least provide an alternative.

To this end, a method of deriving one or more parameters of an optical path or reflective element in an optical network uses an OTDR means to launch light at two different wavelengths into the path and detect backreflected light including light reflected by a wavelength-dependent reflective (HRD) element ($HRD_C$;$HRD_S$) at a distant point of the optical path. The HRD element is highly-reflective at one of the two different wavelengths but not at the other. Comparison of the resulting OTDR traces at the two wavelengths enables the peak attributable to the HRD element to be distinguished from a peak or peaks attributable to other localized reflectances. The OTDR trace at the wavelength at which the HRD is not highly-reflective then may provide information on the Rayleigh Backscattering Signal (RBS) that is not obfuscated by the presence of the HRD element or other similar HRD in the optical network.

In the context of this specification, the expression "OTDR traces" embraces any method of storing or displaying processed data from the OTDR acquisition, the data being proportional to the measured optical backreflection as a function of time delay, this time delay normally being subsequently converted to an optical distance by applying a well-known relationship using a known or assumed index of refraction (IOR) for the path at each OTDR wavelength. Also, the term "HRD element" refers to a wavelength-dependent reflective element whether installed permanently ($HRD_C$) or temporarily ($HRD_S$).

According to one aspect of the invention, there is provided a method of using an optical time domain reflectometer (OTDR) means (22) and a wavelength-dependent reflective element (HRD) in characterizing one or more parameters of an optical path of an optical network, said OTDR and said HRD element being connected to said optical path at respective first and second mutually-spaced points, said HRD element being highly-reflective at one of two predetermined wavelengths ($\lambda 1, \lambda 2$) and significantly less reflective at the other of the two predetermined wavelengths, neither of the two wavelengths corresponding to a normal operating wavelength of the optical path, the method comprising the steps of using said optical time domain reflectometer means (22) connected to said first point of said optical path:

to launch into said first point of the optical path light at each of said two wavelengths ($\lambda 1$) and ($\lambda 2$), to detect at said first point corresponding backreflected light as a function of time at each of said two wavelengths ($\lambda 1, \lambda 2$) and obtain therefrom first and second OTDR traces (OTDR-$\lambda 1$,OTDR-$\lambda 2$), respectively, each representing backreflected light as a function of optical distance along said optical path between said first and second points;

to compare the first and second OTDR traces to distinguish a peak corresponding to said wavelength-dependent reflective element from peaks corresponding to substantially wavelength-independent localized reflectances, and to derive from said peak a value of one or more parameters of either or both of said optical path between the said two mutually-spaced points and said wavelength-dependent reflective element.

Where the optical path is in a point-to-multiple point optical network, said first point at which the OTDR is connected to said optical path may be where the said optical path is common with other paths and the second point at which the HRD element is connected to the optical path may be where the selected optical path is separate from other paths, the reflective element having a reflectance characteristic that is substantially wavelength-dependent, said peak being distinguished from peaks corresponding to other reflective events in any of the commonly-connected optical paths.

Embodiments of the invention are especially suitable for use with passive optical networks comprising an optical line terminal (OLT) connected to multiple optical network units (ONUs) by respective optical paths.

Such embodiments of the invention comprise a method of deriving a value of at least one parameter of a selected optical path of a passive optical network having multiple optical paths whose respective first ends are coupled in common to a network element (OLT), respective opposite ends of at least a plurality of said multiple optical paths being connected, when in service, to a plurality of network units (ONU), respectively, said at least one selected optical path having a reflective element at a position where the selected path can be accessed separately from at least some of the other optical paths, for example at or near said opposite end thereof, said reflective element being highly-reflective at a predetermined first wavelength ($\lambda_1$) and significantly less reflective at a predetermined second wavelength ($\lambda_2$), neither of said wavelengths corresponding to a normal operating wavelength of said network, the method comprising the steps of:

using an OTDR device to launch light at said first wavelength ($\lambda_4$) and at said second wavelength ($\lambda_2$) into said optical paths at a point where said optical paths are commonly-coupled, detecting backreflected light from said multiple optical paths at said first ($\lambda_1$) and second ($\lambda_2$) wavelengths, and obtaining therefrom first and second OTDR traces corresponding to said first ($\lambda_1$) and second ($\lambda_2$) wavelengths, respectively, of detected backreflected light as a function of optical distance from said point; differences between the first and second OTDR reflective peaks levels on traces distinguishing a localized reflective event corresponding to said reflective element from other localized reflective events from any of said commonly-coupled optical paths;

and deriving a value of the parameter from the localized reflective event, said parameter value being outputted in a tangible, real-world concrete form, for example for display by display means.

In the context of this specification, the term "localized" means less than or equal to the spatial resolution of the OTDR.

The OTDR means may determine from said peak its amplitude and location and store these data for subsequent reference.

According to a second aspect of the invention, there is provided a method of deriving at least one parameter of an optical path of an optical network using an OTDR instrument connected at one end of the optical path and two highly-reflective elements connected to the link at a remote position from the OTDR, one of the reflective elements having a higher reflectance at the first wavelength than the other of the reflective elements, and vice versa at the second wavelength, such that light reflected by one reflective element can be distinguished in the OTDR traces from light reflected by the other reflective element.

In preferred embodiments, one of the two reflective elements is permanently installed in the optical path and the other reflective element is portable, being installed temporarily for the duration of the measurements.

The optical network may comprise a plurality of said permanently-installed reflective elements connected to a plurality of optical paths or links, respectively, and the technician may install the second reflective element temporarily into the selected optical path, initiate the OTDR measurements from the common point, and then remove the second reflective element for use in measuring a different link.

Alternatively, the first or second reflective element may be integrated into a transceiver, for example an optical network unit (ONU), installed at the customer premises.

The technician may initiate said OTDR measurements and receive results thereof by communicating with another person at the OTDR end of the link, conveniently by telephone, e-mail or other data transmission.

Alternatively, the technician may control the OTDR personally, conveniently by means of a data link, such as an Internet connection.

Yet another alternative, is for the entire procedure to be controlled from the OTDR end of the link or central office, by means of a data link, such as via the Internet; if desired, at least part of the procedure then being automated.

Various features, objects and advantages of the invention will be apparent from the following detailed description of embodiments of the invention which are described by way of example only with reference to the accompanying drawings.

BRIEF DESCRIPTION OF DRAWINGS

In the drawings, identical or corresponding elements in the different Figures have the same reference numeral.

DESCRIPTION OF PREFERRED EMBODIMENTS

Figure 1:
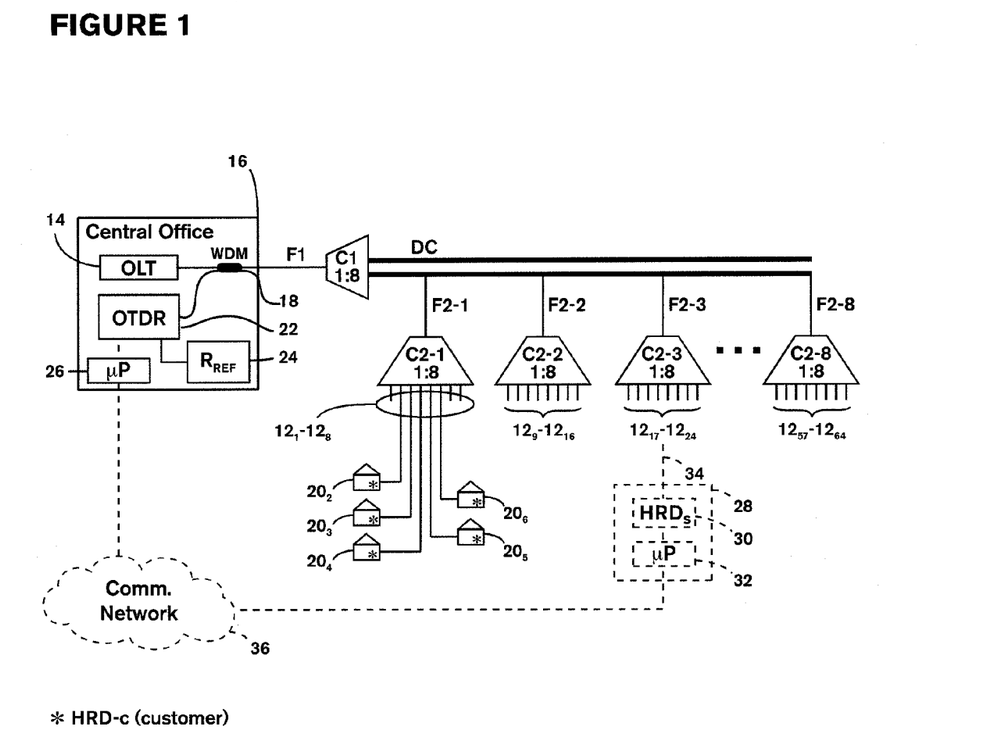
FIG. 1 illustrates a portion of a point-to-multipoint passive optical network (PON) having a reflective element at each of selected ones of the multipoints and an OTDR at a common point, specifically a central office.

FIG. 1 illustrates a portion 10 of an optical network, specifically a Passive Optical Network (PON), comprising multiple "drop" fibers 12 connected to an Optical Line Terminal (OLT) 14 in a central office 16. For purposes of illustration, FIG. 1 illustrates a network having only sixty-four drop fibers $12_1$ to $12_{64}$, in eight groups of eight. Each group of eight drop fibers is connected by a respective one of eight 1×8 couplers C2-1 to C2-8 and a corresponding one of eight distribution fibers F2-1 to F2-8, in a distribution cable DC, to a further 1×8 coupler C1 which is connected to the OLT 14 by way of a single (common) fiber F1 and a wavelength-division multiplexer (WDM) 18. This WDM 18 substantially separates, onto distinct fibers, light at a wavelength corresponding to the normal operating wavelengths range of the PON (e.g. 1310 nm, 1490 nm, 1550 nm) from light propagating in the same fiber corresponding to U-band wavelengths range of the OTDR (e.g. 1625-1675 nm), or, inversely, combines light in these two wavelength ranges onto a single fiber.

When in service, the drop fibers $12_1$ to $12_{64}$ will connect a respective one of multiple user stations 20 to the OLT 14. For ease of depiction and description, FIG. 1 shows only five user stations $20_2$ to $20_6$ connected to coupler C2-1 by drop fibers $12_2$ to $12_6$, respectively.

Each of the network links comprises one of the drop fibers $12_1$-$12_{64}$, the associated one of the distribution fibers F2-1 to F2-8, and the common fiber F1, and defines an optical path between the demarcation point of the user station and the WDM 18. All of the optical paths are "in common" between the WDM 18 and the OLT 14. The common point, i.e., the "single" point of the point-to-multipoint network, is deemed to be the WDM 18 to which an OTDR 22 is connected so it can inject light into, and extract backreflected light from, all of the optical paths.

The OTDR 22 means has a co-located reference reflectance ($R_{REF}$) 24 for use in calibrating the OTDR to facilitate measurement of loss in each optical path. It is shown separate in FIG. 1 but usually would be integral to the OTDR 22. The drop fibers $12_2$ to $12_6$ have associated therewith highly-reflective element $HRD_{C2}$-$HRD_{C6}$, respectively, each depicted by an asterisk in FIG. 1. Each highly-reflective element is located at or near the demarcation point, i.e., the end of the associated drop fiber; conveniently inside the corresponding one of the ONUs $20_2$-$20_6$ to which the drop fiber is connected, when in service. It will be appreciated that some of the fibers may not be "in service", for example because they have yet to be connected to a user station or the fiber is broken or otherwise unfit for use.

The WDM 18 connects both the OLT 14 and the OTDR 22 to the end of optical fiber F1 so that the OTDR 22 can be used to launch light into the fiber F1 and, hence, the fibers F2-1 to F2-8 and drop fibers $12_1$ to $12_{64}$. It will be appreciated that such light will be launched into all of the drop fibers, regardless of whether or not they are in service, i.e., connected to a user station. Likewise, the OTDR will extract the backreflected light from all of the optical paths.

Each of the reflective elements $HRD_{C2}$ to $HRD_{C6}$ is highly-reflective at a first wavelength $\lambda_1$, for example 1650 nm, but significantly less reflective at other wavelengths, and especially at a second wavelength $\lambda_2$, for example 1625 nm. Neither of the wavelengths $\lambda_1$ and $\lambda_2$ is a normal operating wavelength of the network. Accordingly, the OTDR means 22 is used to launch light into the links, via common point 18, at the two different wavelengths $\lambda_1$ and $\lambda_2$, in turn.

Installation and Detection of Reflective Elements

With the centralized system idle or performing preventive maintenance on connected PON lines, a technician adds the first reflective element, $HRD_{C2}$ to drop fiber $12_2$ at the demarcation point at the subscriber premises $20_2$; in practice, inside the ONU installed at those premises. The technician remotely initiates operation of the OTDR 22 (at CO 16) to perform a previously-programmed test which involves launching two series of light pulses at different wavelengths into the common fiber F1 at the common point WDM 18 to detect the newly-added $HRD_{C2}$. The request includes identification of the PON link or, because the OTDR 22 usually would be shared by many PONs (and WDMs) by means of an optical switch, identification of the OTDR and optical switch port (not depicted) connected to that PON, plus the ID he wishes to attribute to $HRD_{C2}$ and, optionally, the ID of the associated C2 splitter. A variety of different methods might be used by the technician to initiate operation of the OTDR 22; for example calling an operator at the central office 16, sending a Short Message Service (SMS) message to the central office 16, using a web browser and the Internet or a private network to communicate directly with the microprocessor 26 or a global server, and so on.

FIG. 1 shows a processor 26 for controlling the operation of the OTDR 22. The processor 26 might be integrated into the OTDR 22 and initiate operation of the OTDR 22 on receipt of commands/requests from a technician or a supervisory and administration computer elsewhere in the system. The processor 26 might itself perform supervisory and administration functions for the local part of the system.

The procedure followed by the OTDR 22, specifically under the control of the processor 26, to detect each reflective element $HRD_C$ by obtaining first and second OTDR traces at, respectively, a first wavelength $\lambda1$, at which the reflective element $HRD_C$ is highly-reflective, and a second wavelength $\lambda2$ at which it is not, will now be described in more detail with reference to FIGS. 2 and 3(a) to 3(c). Thus, referring to FIG. 2, in steps 2.01 and 2.02, the OTDR acquires two traces, namely OTDR-$\lambda1$ at wavelength $\lambda_1$, i.e., 1650 nm and OTDR-$\lambda2$ at wavelength $\lambda_2$, i.e., 1625 nm, shown in FIGS. 3(a) and 3(b), respectively. For the purposes of this description, it is assumed that there are four wavelength-independent events reflecting light at both wavelengths $\lambda_1$ and $\lambda_2$ to produce peaks P1, P2, P4 and P6 in each trace and two HRDc reflective elements producing two corresponding peaks P3 and P5 in both traces.

Figures 3, 3A:
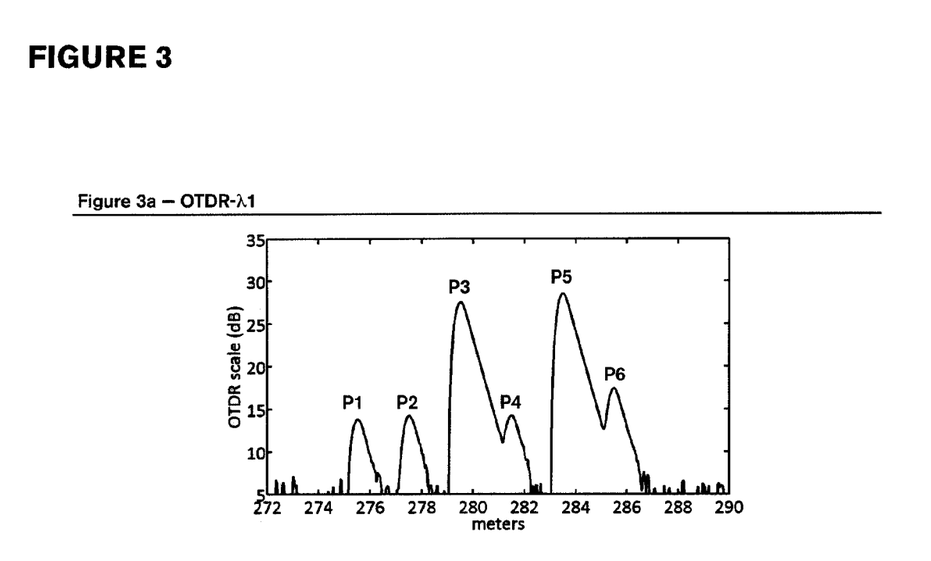
FIGS. 3(a) to 3(c) illustrates two typical traces measured by the OTDR at two different wavelengths in an optical path of the network of FIG. 1 and differences between the traces.
Figure 3B:
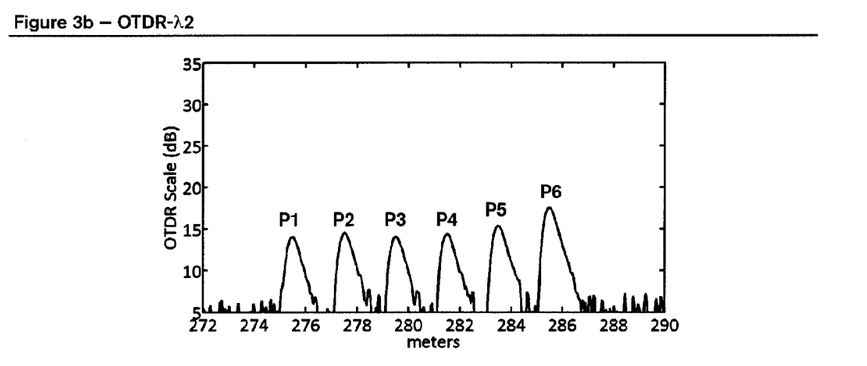

In trace OTDR-$\lambda1$ shown in FIG. 3(a), two of the localized events, i.e., peaks P3 and P5 are produced by $HRD_C$ reflective elements that are highly-reflective at wavelength $\lambda_1$. In trace OTDR-$\lambda2$ in FIG. 3(b), however, they are much smaller because the $HRD_C$ reflective elements have a much lower reflectance at the second wavelength $\lambda2$.

Figure 2:
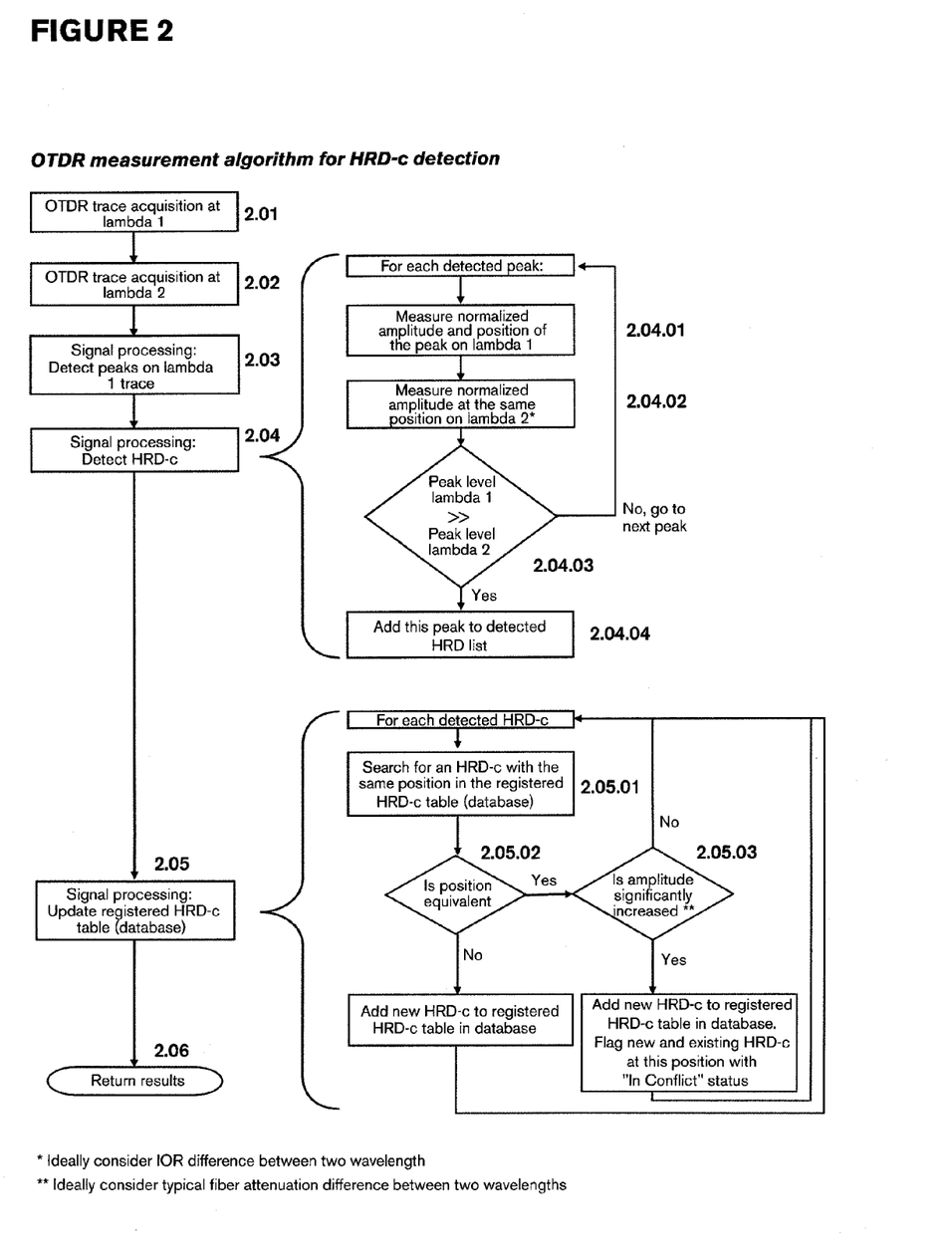
FIG. 2 is a flowchart depicting operation of the OTDR to detect a newly-installed highly-reflective element.
Figure 3C:
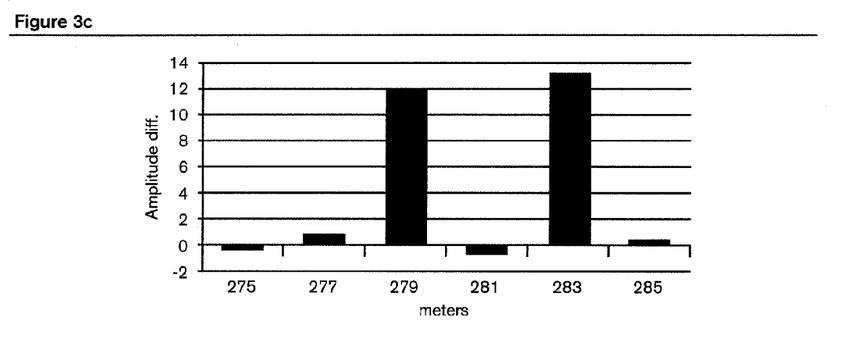

In step 2.03, the processor 26 processes the first trace (OTDR-$\lambda1$) to detect peaks and, in step 2.04, detects the new $HRD_{C2}$ by carrying out a series of steps shown as a subroutine in FIG. 2. Thus, for each detected peak of the trace OTDR-$\lambda1$, in step 2.04.01, the processor 26 measures the normalized amplitude and position of that peak and, in step 2.04.02, measures the normalized amplitude at the same position of the second trace OTDR-$\lambda2$. In practice, the position of the peak is measured relative to a position reference element on the trace in order to compensate for distance offset between two wavelengths, thereby defining a "normalized position". The same reference is used for both traces OTDR-$\lambda1$ and OTDR-$\lambda2$ to ensure that peak level is measured at the same position, regardless of OTDR "zero" calibration differences between the traces. FIG. 3(c) shows the differences in amplitude at the locations of the peaks. It will be appreciated that the OTDR traces are logarithmic so subtracting one from the other effectively constitutes division of their respective amplitudes.

In decision step 2.04.03, the processor 26 compares the normalized amplitude of the OTDR-$\lambda1$ peak with the amplitude of second trace OTDR-$\lambda2$ at the corresponding position and, if the difference between the two amplitude measurements does not exceed a predetermined threshold level T, the processor 26 determines that the peak is not a localized event of an $HRD_C$, discards it, and selects the next peak in first trace OTDR-$\lambda1$ for processing in a similar manner. If step 2.04.03 determines that the difference between the two normalized amplitude measurements does exceeds the predetermined threshold level T, the peak is deemed to be a localized event caused by an $HRD_C$ and, in step 2.05 of the main routine, is added with its identifier and position, to a table, as illustrated in Table I below. This process is repeated until all of the detected peaks have been considered.

In order to add the detected $HRD_C$ to the table, the processor 26 first searches the Table I stored in its memory for a previously-registered $HRD_C$ with substantially the same position, i.e., within peak separation capabilities of the OTDR (0.5 m for example). If decision step 2.05.02 determines that the table does contain another $HRD_C$ whose position is equivalent, i.e., within the peak separation capabilities of the OTDR, decision step 2.05.03 determines whether or not the amplitude of the "new" $HRD_C$ is significantly greater than that of the previously-registered (equivalent) $HRD_C$. If it is not, step 2.05.03 returns the program to select another detected $HRD_C$ and repeats steps 2.05.01 to 2.05.03.

If, on the other hand, step 2.05.03 determines that the amplitude of the "new" $HRD_C$ is significantly greater than that of the previously-registered $HRD_C$, step 2.05.06 adds the new $HRD_C$ to the table at this position but flags (i.e., identifies) the new and previously-registered $HRD_C$s as being "In Conflict" so that they can be investigated. The program then returns to the beginning of the subroutine to await another detected $HRD_C$.

When step 2.05 has added all detected $HRD_C$'s to the table, step 2.06 returns the results to the technician who requested the test.

The use of two wavelengths and $HRD_C$ reflective elements that are highly-reflective at only one of them offers better performance for localizing fiber breaks on cable F2 and dead zones are greatly reduced.

The manner in which $HRD_{C2}$ to $HRD_{C6}$ are installed, and their amplitudes and positions stored for subsequent supervisory and maintenance purposes, will now be described with reference to the flowchart shown in FIG. 3.

Once the detection sequence for each $HRD_C$ reflective element has been completed, the processor 26 stores the data in its memory, as shown in Table I below, and returns the result (success, distance, loss, position conflict, conformity to cabling and network standard, etc. . . . ) to the technician, conveniently but not necessarily using the same communication method used by the technician to request the test.

The technician may then repeat the operations to install and detect each of the other $HRD_C$'s in turn, the data being added to the Table.

Table I(A) below illustrates the entries in the Table after $HRD_{C2}$ and $HRD_{C3}$ have been detected and their positions and normalized amplitudes entered. Table I(B) shows a corresponding set of Table data of $HRD_C$'s detected following the OTDR test. The processor compares Table I(A) and Table I(B) to generate Table I(C) where newly detected $HRD_C$'s are listed and identified as requested. Table I(C) is then returned to the technician entirely or partially (showing only new $HRD_C$'s).

It should be noted that association of the $HRD_C$ peak with a specific optical link is easier when they are added one by one with a simultaneous "on demand" OTDR test to detect each of them. However, many new $HRD_C$'s can be detected in a single detection sequence, especially if their positions are known to be in sequence at the outset, for example because the technician just installed them and knows approximately their respective positions relative to each other and/or the common point (OTDR).

TABLE I

| $HRD_C$ ID | Normalized Position | Normalized Amplitude | Computed Link Loss |
|---|---|---|---|
| (A) Registered $HRD_C$ table (database) | | | |
| $HRD_{C2}$ | 261m | 4 dB | 19 dB |
| $HRD_{C3}$ | 279m | 3 dB | 20 dB |
| (B) Detected $HRD_C$ table | | | |
| — | 261m | 4 dB | 19 dB |
| — | 279m | 3 dB | 20 dB |
| — | 283m | 2 dB | 18 dB |
| (C) Updated Registered $HRD_C$ table (database) | | | |
| HRD-c ID | Normalized Position | Normalized Amplitude | Computed Link Loss |
| $HRD_{C2}$ | 261m | 4 dB | 19 dB |
| $HRD_{C3}$ | 279m | 3 dB | 20 dB |
| $HRD_{C4}$ (new) | 283m | 2 dB | 18 dB |

Detection of each new HRD element is limited by OTDR dynamic range and OTDR spatial resolution (which is mainly determined by pulse width and receiver cut-off frequency). When an HRD element is added at a similar optical distance to that of an existing HRD element, direct trace comparison will improve HRD separation capabilities since sampled peak shape will be modified. This technique is facilitated by good signal-to-noise ratio and high sampling resolution.

It should be noted that the processor 26 also uses the OTDR traces to determine the losses for the different optical paths and includes the loss values in the Table for future use. Thus, once the $HRD_C$'s have been installed and registered in the Table, with their respective positions and normalized amplitudes, they can be used for routine monitoring and troubleshooting, an example of which will be described with reference to the flowchart shown in FIG. 4.

Figure 4:
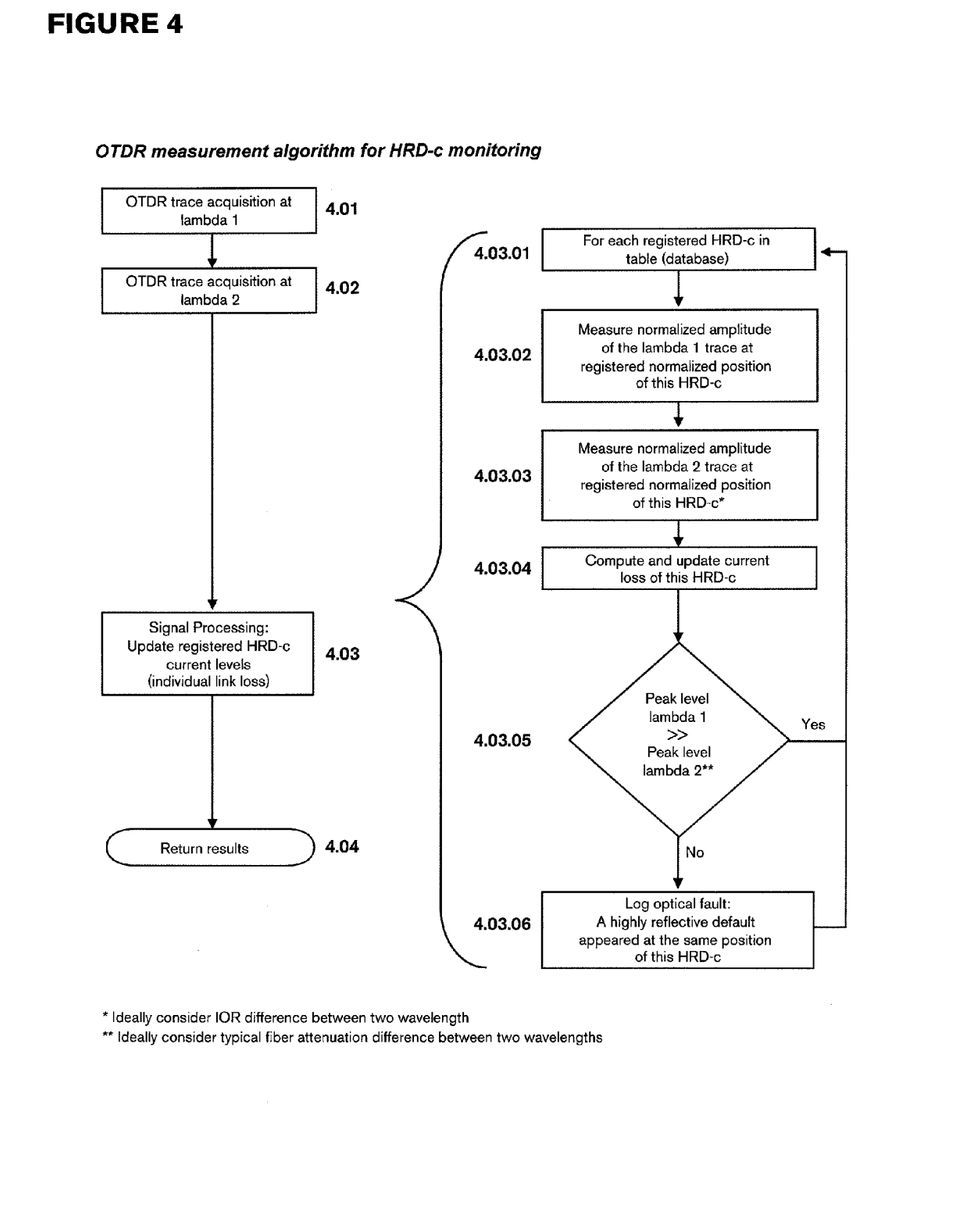
FIG. 4 illustrates monitoring of the network of FIG. 1 using the highly-reflective element(s)

It is assumed that, whether a link is in service or not, if a $HRD_C$ terminates the link, it is "connected" and will be monitored. Thus, while performing preventive maintenance acquisitions on connected PON lines, or upon receipt of a test request on a specific PON line, for example by a technician, the OTDR 22 acquires (in steps 4.01 and 4.02) OTDR traces OTDR-λ1 and OTDR-λ2 at wavelengths λ1 and λ2, respectively. In step 4.03, the processor 26 processes the OTDR traces to obtain updated data about the various registered $HRD_C$'s, specifically individual link loss values. For each registered $HRD_C$ in the Table, in step 4.03.02, the processor 26 measures the normalized amplitude of trace OTDR-$\lambda_1$ at the registered normalized position shown in the Table for that particular $HRD_C$. In step 4.03.04, the processor performs the same measurement upon trace OTDR-λ2 (preferably taking into account the index of refraction (IOR) difference between the two wavelengths $\lambda_1$ and $\lambda_t$, which may be significant if the link is long, e.g., a few tens of kilometers). In step 4.03.05, the processor 26 computes the current loss for the link to which that $HRD_C$ is connected and updates the table with the result.

In decision step 4.03.05, the processor 26 determines whether the peak level of trace OTDR-λ1 at the position corresponding to the $HRD_C$ in question (from the Table) is in fact the localized event corresponding to that $HRD_C$ or a reflection from some other highly reflective event (e.g. a fault) at the same position in the optical path. It does so by determining, in decision step 4.03.05, whether the peak level of trace OTDR-λ1 is significantly greater (e.g., 4 $dB_{OTDR}$) than the peak level of trace OTDR-λ2 at the same position. If it is, the processor 26 determines that it is produced by the $HRD_C$ and proceeds to the beginning of the subroutine, step 4.03.01, either to repeat the subroutine for the next registered $HRD_C$ in the Table, or, if there is none, exits the subroutine and makes updated measurement available for degradation and failure analysis by the processor 26 or high level monitoring system (see below).

If, however, decision step 4.03.05 determines that there is no significant difference between the two peaks (e.g., less than 4 $dB_{OTDR}$), step 4.03.06 records, or logs to a test report, the likely occurrence of an optical fault of some kind at the same position as the $HRD_C$ in question and returns to step 4.03.01 to inspect the next registered $HRD_C$ (if any). Once every $HRD_C$ has been inspected, the subroutine is completed and the test report is returned to the source of the test request in step 4.04.

Once the loss value(s) of the one or more $HRD_C$'s under test have been obtained, the processor 26 compares each with a predetermined maximum loss threshold and with initial loss and/or last compliant loss obtained for each $HRD_C$ from an earlier test to compute deviation, which is then compared to a predetermined deviation threshold. In the event that deviation exceeds the threshold or there is any reported anomaly in step 4.03.06, the processor 26 may initiate a troubleshooting sequence. In a double-stage PON configuration as shown in FIG. 1, association of each of the $HRD_C$'s with a splitter identifier (ID) will facilitate isolation of a fault to a specific fiber segment. (Many fault conditions allow fault isolation to indicate whether the problem is upstream or downstream of the associated splitter). The processor 26 may also launch a Rayleigh Backscattering (RBS) fault detection process to locate any observable deviation of RBS signature of the OTDR trace.

RBS Measurement in the Presence of Strong Reflective Elements

The processor 26 will normally be configured to obtain a reference RBS trace every time a new $HRD_C$ is added to the PON. When a fault has been indicated for that link during the above-described monitoring, the processor 26 may cause the OTDR means 22 to acquire at least one trace OTDR-$\lambda 2$ at wavelength $\lambda 2$ but using longer pulses to determine the location of the fault by comparing the longer-pulse trace with the reference RBS trace using trace comparison algorithms.

Figure 6:
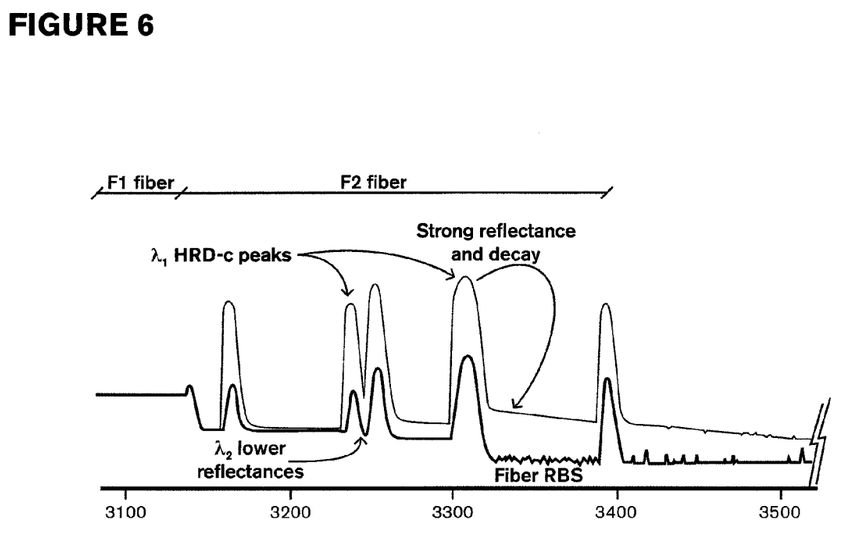
FIG. 6 illustrates an OTDR trace comprising reflective events caused by wavelength-dependent reflective elements from which the RBS can be determined.

Providing the reflectance of the HRD element at the second wavelength ($\lambda 2$) is sufficiently low, the decay and dead zone effects attributable to the HRD element may be reduced to such an extent that Rayleigh backscatter (RBS) can be determined from the OTDR trace for optical distances (not necessarily in the selected optical path) greater than the distance between the OTDR and the HRD element. This is illustrated in FIG. 6 which shows the typical OTDR trace for the five HRDC elements of FIG. 1—but cut off at about 3450 meters so peaks of more-distant $HRD_S$ in the network are not shown. Fiber RBS between $HRD_C$ peaks P4 and P5 and, partially, beyond P5 which is obfuscated by strong reflectance and decay in the OTDR-$\lambda 2$ trace at wavelength $\lambda 2$.

Use of Temporarily-Installed Reflective Elements $HRD_S$.

The acquisition of OTDR traces at two different wavelengths $\lambda 1$ and $\lambda 2$ using a reflective element that is highly-reflective at wavelength $\lambda 1$ but not at wavelength $\lambda 2$ advantageously improves detection robustness and facilitates inspection of fibers F1 to F8. Advantageously, a different reflective element ($HRD_S$) that is highly-reflective at the second wavelength $\lambda 2$ but not at first wavelength $\lambda 1$ (i.e., the converse of the first reflective element ($HRD_C$)) may be used to make measurements or perform tests in an optical network in which one or more of the first reflective elements $HRD_C$ have been installed previously. The different highly-reflective element $HRD_S$ might be carried by a technician and inserted into the optical path temporarily at a suitable position, for example where there is, or can be inserted, a connectorized joint, in order to take measurements from the common point (WDM 18) to the insertion point of the $HRD_S$ without the risk of distance conflict with a permanently installed $HRD_C$ on the same or other link.

It is envisaged that the temporary HRD element could be included in a hand-held instrument having connectors or a patch cord/pigtail fiber for connecting it into the optical path. The instrument 28 could also include means for direct communication with the central office to initiate the OTDR measurement and receive the results. For example, the instrument might have a cellular or satellite transceiver, a display screen and a microprocessor suitably programmed to control communications and display.

FIG. 1 illustrates, in dashed lines, such a remote control device 28 including such a temporary reflective element $HRD_S$ 30 and a microcomputer 32 having a user interface. The $HRD_S$ 30 is shown connected to coupler C2-3 by a patch/pigtail fiber 34 connected to drop fiber $12_{21}$. The microcomputer 32 communicates with the central office processor 26 by way of a communications (data) network 36. Use of such a remote control device 28 will now be described with reference to the flowchart shown in FIG. 5.

With the $HRD_S$ 30 installed, the technician uses the microcomputer 32 to communicate with the central office processor 26, using one of the communication modes described above, and initiate the acquisition of OTDR traces by OTDR 22, whereupon, in steps 5.01 and 5.02, the processor 26 causes the OTDR 22 to acquire first and second traces OTDR-$\lambda 1$ and OTDR-$\lambda 2$ at wavelengths $\lambda 1$ and $\lambda 2$, respectively. As before, in step 5.03 the processor 26 processes the traces to detect peaks, but this time applying step 5.04 to the OTDR-$\lambda 2$ trace acquired at wavelength $\lambda 2$, locates the peak corresponding to $HRD_S$. Step 5.04 comprises a series of steps shown as a sub-routine in FIG. 5.

Figure 5:
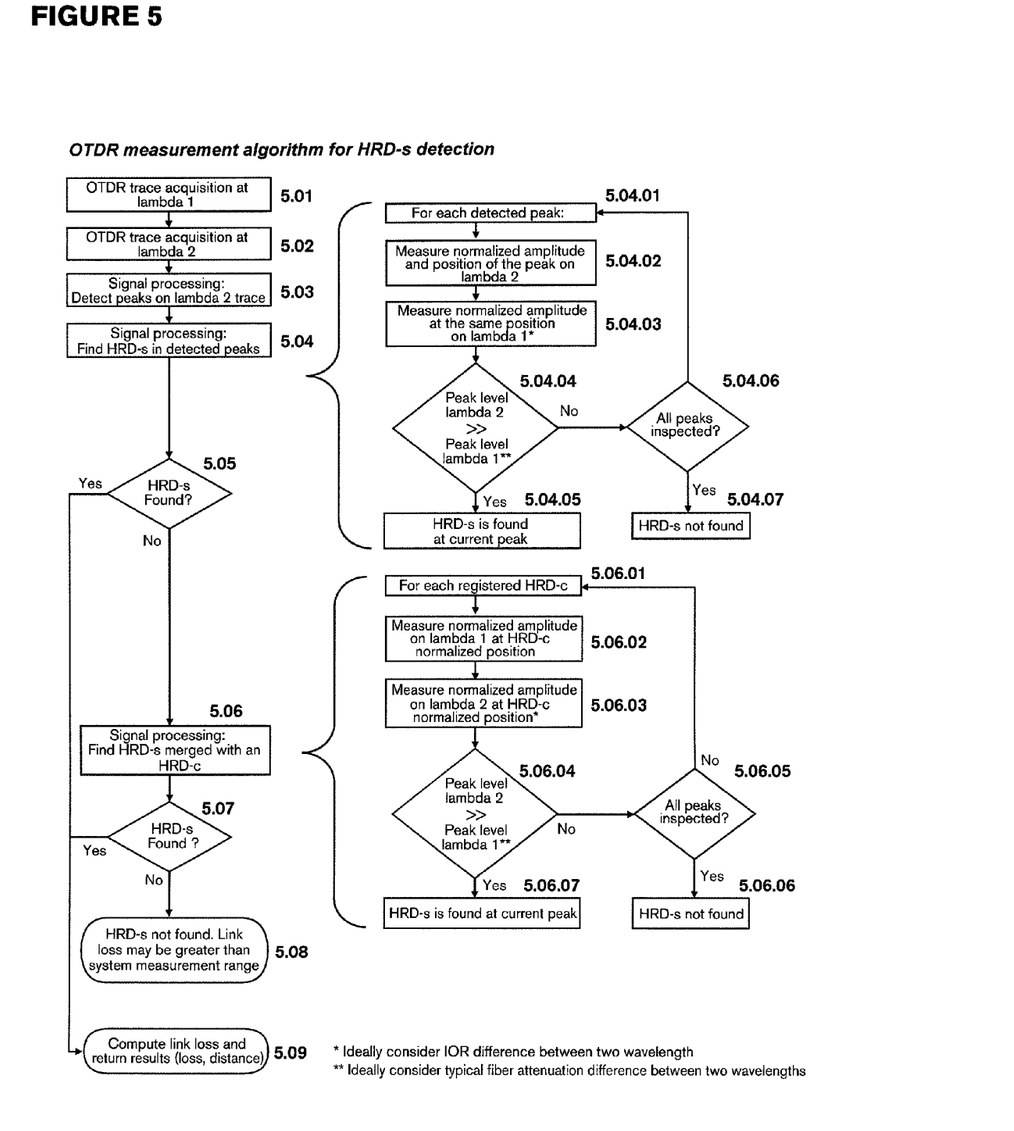
FIG. 5 illustrates the use of a second, temporary wavelength-dependent reflective element to make measurements or perform tests in the network of FIG. 1 with previously-installed permanent wavelength-dependent reflective elements.

Thus, for each detected peak (step 5.04.01), in step 5.04.02 the processor 26 measures the normalized amplitude and position of the $HRD_S$ peak in the trace OTDR-$\lambda 2$. In step 5.04.03, the processor 26 measures the normalized amplitude of the OTDR-$\lambda 1$ trace at the same position, preferably taking into account the index of refraction (IOR) difference between the two wavelengths. In decision step 5.04.04, the processor 26 determines whether the two amplitudes differ by a significant amount, for example 4 $dB_{OTDR}$. If they do, the processor 26 determines that the current peak corresponds to $HRD_S$ and indicates that in step 5.04.05. If, however, step 5.04.04 determines that the peak does not correspond to the $HRD_S$, step 5.04.06 determines whether or not all peaks have been inspected and, if not, the processor 26 repeats steps 5.04.01 to 5.04.05 for the next peak, and, if finally the $HRD_S$ is not found, this is indicated in step 5.04.07.

If steps 5.04.06 and 5.05 indicate that the $HRD_S$ has been found, the processor 26 proceeds to step 5.09 to compute link loss and returns the results (loss, distance, etc.) for transmission/display to the technician.

If, however, steps 5.04.06 and 5.05 indicate that the $HRD_S$ has not been found using this simple differential analysis, step 5.06 performs further signal processing to determine whether or not the reflection from $HRD_S$ has been merged with or obscured by a strong reflection from one of the permanent $HRD_C$ reflective elements that happens to be at the same optical distance from the OTDR means 22 and for which the position is already known. Thus, referring to the sub-routine, in steps 5.06.02 and 5.06.03, respectively, the processor 26 measures the normalized amplitude of traces OTDR-$\lambda 1$ and OTDR-$\lambda 2$ at the normalized position of the [nearest] $HRD_C$ (from the Table I), preferably taking into account IOR differences between the two wavelengths. In step 5.06.04, the processor compares the two amplitudes to determine whether or not they are approximately the same, e.g. less than 4 $dB_{OTDR}$, ideally taking into account typical fiber attenuation differences between the two wavelengths. If the two amplitudes are not approximately the same, step 5.06.05 determines whether or not all peaks have been inspected and, if not, returns to repeat steps 5.06.01 to 5.06.05, setting a flag (in step 5.06.06) to indicate that the $HRD_S$ has not been found.

If step 5.06.04 determines that the two amplitudes are approximately the same, step 5.06.07 sets a flag to indicate that the current peak corresponds to $HRD_S$.

Step 5.07 determines whether or not the $HRD_S$ was located by step 5.06 and, if so, jumps to step 5.09 to compute link loss and return the results (loss, distance, etc.) to the technician, as before. On the other hand, if step 5.07 determines that the $HRD_S$ has not been found, step 5.08 indicates that the link loss may be greater than the system measurement range with the HRD, which is at least 35 dB. The central office processor 26 transmits this result to the microcomputer 32 in remote control device 28 which causes it to be displayed to the technician.

It should be noted that, although the section of the PON shown by way of example in FIG. 1 has a total splitting ratio of 1:64, the present invention also applies to other PON configurations.

The use of an OTDR to obtain traces at two (or more) different wavelengths, with a HRD reflective element that is highly-reflective at one or some of the wavelengths but not at one or some of the other(s), not only allows absolute link loss measurement, but also allows a service technician to use the centralized system to make measurements with no more specialized tools with him than a temporary $HRD_S$ that is to be connected to any measurement point on the PON where a connectorized joint exists or can be made. The technician calls the remote OTDR system at the CO to undertake both loss and length measurements. When the PON is highly-populated with permanently-installed $HRD_C$ reflective elements, there is a probability that the temporary $HRD_S$ will have been inserted at the same optical length as one of the permanently-installed $HRD_C$ reflective elements. Without the use of an $HRD_S$ reflective element for temporary HRD measurements in this case, the measurement would probably fail, leading to the need for length management strategies by the technician and repeated measurement attempts.

The use of a different $HRD_S$ is also advantageous if the technician needs to measure link loss and length to a connection point further downstream from the OLT than the $HRD_C$ on the same optical link, as it allows a differential analysis to be performed to qualify the portion of the link between the $HRD_C$ (representing a demarcation point) and the $HRD_S$, which may be at or adjacent the customer ONU, for example.

It will be appreciated that, although, the foregoing description has each of the $HRD_C$'s connected to the demarcation end of the drop fiber 12, it could be connected at any point where the optical path is unique physically, i.e., anywhere between the WDM and the demarcation subscriber end of the drop fiber 12. In practice, there likely would be no reason to connect it before coupler C1, but there would probably be situations where it was desirable to connect it to the F2 fiber between the WDM and any of the coupler C2-1 to C2-8. Likewise, the OTDR 22 could be connected at any point where the optical paths are in common, i.e., between the OLT 14 and the coupler C. Whatever the physical configuration, the optical path under test is considered to be between the OTDR and the HRD in question.

It will be appreciated that step 2.03, which detects all reflective peaks on the OTDR-λ1 trace, may do so simply by standard OTDR trace analysis that identifies the position of each reflective peak.

It will be appreciated also that the invention is not limited to point-to-multipoint optical networks but could be applied to point-to-point paths in an optical networks too. For example, a wavelength-dependent reflective (HRD) element and a two-wavelength OTDR means 22 may be used to measure the loss of the optical path from the OTDR to the said wavelength-dependent reflective element, even in the presence of adjacent substantially wavelength-independent reflective events caused by poor connections, etc. Additionally or alternatively, they may be used to measure the RBS signal downstream from the said wavelength-dependent reflective element.

Figure 7:
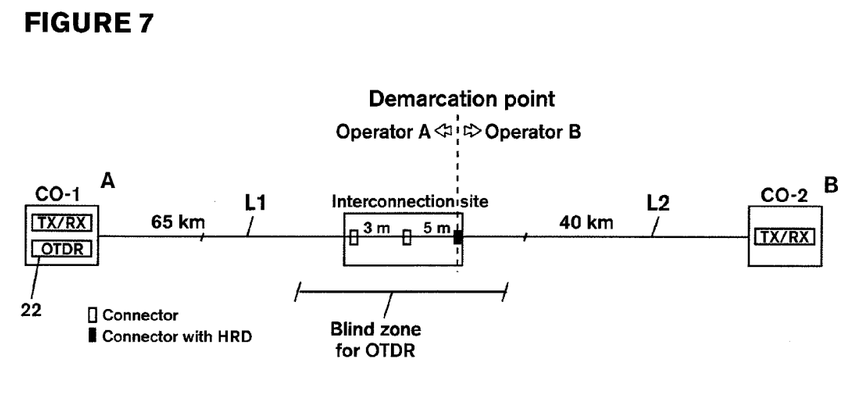
FIG. 7 illustrates another embodiment of the invention in which a highly-wavelength-dependent reflective element and two-wavelength OTDR are used to make cumulative loss measurement at a precise demarcation point in a blind zone for RBS measurement without preventing RBS measurements of fiber sections beyond the HRD.

Such applications will now be described with reference to FIG. 7 which shows a first central office CO-1 of a first service provider (operator) A and a second central office CO-2 of a second service provider (operator) B interconnected by first and second optical links L1 and L2, respectively, with a demarcation point between them. In the vicinity of the interconnection site, there will usually be patchcord connections: FIG. 7 shows, as an example, a 3 meter patch cord and a 5 meter patchcord connected in series between the link L1 and the adjacent end of link L2 by suitable connectors. As a general rule, each service provider or operator will be responsible for the optical path and equipment at its own side of the demarcation point.

If a fault or failure, such as an excessive loss, occurs somewhere in the optical path from CO-1 to CO-2, operator A may wish to know whether the fault is before or after a demarcation point between links L1 and L2. If a wavelength-dependent reflective element HRD is in the optical path at the demarcation point, operator A may use the OTDR means 22 at central office CO-1 and connected into the optical path, as before, via a WDM coupler (not shown in FIG. 7), which emits at a wavelength where the HRD element is strongly reflective, to monitor the links from CO-1 towards CO-2. The HRD element will produce a strong reflection, and detection of this HRD element-reflected light, in the absence of other nearby reflective events, allows loss (or change in loss, with respect to an earlier baseline measurement) to be calculated for the optical path between the OTDR means 22 at CO-1 and the demarcation point by measuring the normalized amplitude of the reflected signal corresponding to the HRD element.

It should also be noted that the use of the second wavelength permits the RBS signal emanating from parts of the path(s) further from the OTDR than the HRD element to be directly measured, without either the strong attenuation suffered by a measurement at the first wavelength or the dead-zone obfuscation that would obscure the RBS immediately downstream from the HRD element. In this way, operator A might be able to advise operator B not only that there is a fault condition on operator B's link L2 but also its approximate location.

It should be noted that it is not essential for the OTDR means 22 to have normalization means if the parameter being measured is merely the location of the HRD. However, normalization would be needed if measuring, for example, the loss of the optical path or a quantitative change in such loss.

It will be appreciated that, although the above-described preferred embodiment employs a WDM 18, the latter may be replaced by an optical splitter (e.g. 50:50) by adding appropriate blocking filters in front of the OLT (e.g. filter to block U band light) and the OTDR (e.g. filter to block all wavelengths other than U band).

It also envisaged that a single OTDR means may be used to measure and/or monitor more than one optical network (e.g. PON network), by employing an optical switch between the OTDR 22 and the WDM 18 (not shown). This switch would allow the OTDR to be connected, in turn, to multiple optical networks, each connected to a network element (e.g. OLT) in a common physical location (e.g. Central Office).

The invention is not limited to the use of one characteristic for the highly-reflective (HRD) elements or to only two wavelengths. It is envisaged that more than one HRD reflectance profile as a function of wavelength could be used, i.e., that the HRD element may comprise more than one localized wavelength-dependent reflective event mutually spaced to create a unique reflective peak pattern in the OTDR trace.

It is also envisaged that more than two wavelengths could be used, whether with an HRD element based on a single localized event or with an HRD element based on an aforedescribed more complex reflectance profile. Identification of HRD element type would be done by the same peak level comparison applied to more than two traces at two different wavelengths. The HRD element would be identified by those wavelengths that are or are not strongly reflected by it (n wavelengths represent n bits of binary numbering). Also, reflectivity of the HRD element with respect to wavelength could have more than two amplitudes (e.g., high reflectance, medium reflectance, low reflectance) in order to increase coding variables.

Although the second wavelength ($\lambda 2$) OTDR trace for HRD detection purposes can be used to measure an HRD-s level located after an HRD-c on the optical path, it is not suitable for RBS measurement because the available dynamic range of the RBS signal is limited by the pulse width typically used to spatially discriminate reflective elements. In order to detect RBS properly, one or more additional OTDR traces at wavelength $\lambda 2$ may be acquired using more appropriate OTDR settings (for instance: longer pulse width than the second trace) to facilitate RBS signal measurement and tentatively localize fiber events and faults. As mentioned, presence of HRD-c on the optical network will not obfuscate RBS measurement since HRD-c aren't reflective at $\lambda 2$. The additional trace can be used for detection of fiber link elements (connectors, splices, etc.) from the RBS signal using known OTDR signal processing means on the common optical path of a point-to-multipoint network. Using said additional trace, resultant backscattered light from one end of the network up to multiple ends of a point-to-multipoint seen from OTDR (22) can be compared with one or more previously-stored reference traces using known OTDR trace comparison algorithms to localize fiber faults. The acquisition of the at least one additional trace may be driven by HRD-c measurements results: upon detection of a degradation in one or many optical path by monitoring HRD-c levels using first traces at $\lambda 1$ and $\lambda 2$, the microprocessor (26) deciding to launch one or more acquisitions to inspect RBS signature and locate failure according to reference traces.

The invention further comprehends an optical network having a plurality of the HRD elements deployed in its multiple optical paths, an OTDR means 22 for performing the prescribed OTDR measurements to determine the one or more parameters, and processor means for initiating the measurements at predetermined intervals, comparing the measurements with previously-obtained measurements of the same one or more parameters, and signalling an alarm condition if any difference is greater than a prescribed limit.

Although embodiments of the invention have been described and illustrated in detail, it is to be clearly understood that the same are by way of illustration and example only and not to be taken by way of limitation, the scope of the present invention being limited only by the appended claims.

The invention claimed is:

1. A method of using an optical time domain reflectometer (OTDR) means (22) and a wavelength-dependent reflective (HRD) element in characterizing one or more parameters of a selected optical path of an optical network, said OTDR and said HRD element being connected to said selected optical path at respective first and second mutually-spaced points, said HRD element being highly-reflective at one of two predetermined wavelengths ($\lambda 1, \lambda 2$) and significantly less reflective at the other of the two predetermined wavelengths, neither of the two wavelengths corresponding to a normal operating wavelength of the optical path, the method comprising the steps of:

using said optical time domain reflectometer means (22) connected to said first point of said selected optical path:
to launch into the selected optical path at said first point light at each of said two wavelengths ($\lambda 1$) and ($\lambda 2$),
to detect at said first point corresponding backreflected light as a function of time at each of said two wavelengths ($\lambda 1, \lambda 2$) and obtain therefrom first and second OTDR traces (OTDR-$\lambda 1$, OTDR-$\lambda 2$), respectively, each representing backreflected light as a function of optical distance;
to compare the first and second OTDR traces to distinguish a peak corresponding to said HRD element from peaks corresponding to wavelength-independent localized reflectances, and
to derive from said peak a value of one or more parameters of either or both of said HRD element and said selected optical path between said first and second mutually-spaced points.

2. A method according to claim 1, wherein the selected optical path is in a point-to-multiple point (PMP) optical network, said first point at which the OTDR is connected to said selected optical path is common to more than one of plural optical paths, and said second point at which the HRD element is connected to the selected optical path is unique to said selected optical path, and wherein the step of detecting at said first point corresponding backreflected light detects backreflected light from said more than one of the plural optical paths, and the distinguishing step distinguishes said peak corresponding to said HRD element from peaks corresponding to other reflective events in any of the commonly-connected optical paths.

3. A method according to claim 2, wherein said selected optical path extends between an optical line terminal (OLT) and an optical network unit (ONU) of a passive optical network (PON).

4. A method according to claim 1, wherein the OTDR means has normalizing means for normalizing the detected backreflected light power with respect to the power of the light launched into the optical path.

5. A method according to claim 4, wherein
the normalizing means of the OTDR means comprises a known reference reflectance, and the HRD element has a known reflectance value at the said one of the two predetermined wavelengths at which said HRD element is highly-reflective; and
wherein the step of deriving the said one or more parameter(s) derives the loss of the optical path between the first and second points in dependence upon the reference value and the known reflectance value.

6. A method according to claim 4, wherein:
the normalizing means of the OTDR means comprises a known reference reflectance, and, at the said one of the two predetermined wavelengths, the reflectance value of the HRD element is substantially stable in time,
the difference in the acquired OTDR data between the peak attributable to the HRD element and the said reference reflectance value has been previously measured and stored as a baseline measurement, and
where the difference in the acquired OTDR data between the peak attributable to the HRD element and the said reference reflectance is measured again to provide a current difference value,
the step of deriving said one or more parameters then deriving the change in loss of the optical path between the first and second points in the time interval between the previous and current measurements.

7. A method according to claim 6, wherein the selected optical path is one of a plurality of paths of a point-to-multipoint optical network having respective first ends connected in common at said first point, each having a respective one of a plurality of wavelength-dependent reflective (HRD) elements at a predetermined distance from said first point, and wherein the method comprises repeatedly deriving said one or more parameters and determining variations of said one or more parameters between successive measurements.

8. A method according to claim 1, wherein the reflectance and insertion loss of said HRD element at said other wavelength ($\lambda_2$) are sufficiently low that high attenuation and concomitant decay and dead zone effects attributable to said HRD element at said one wavelength ($\lambda_1$) do not significantly obfuscate any expected Rayleigh backscatter (RBS) in said backreflected light emanating from an optical distance farther from said first point than the optical distance of the said HRD element from the said first point, the method further comprising the step of measuring said level of RBS at said other wavelength ($\lambda_2$).

9. A method according to claim 1, wherein said optical network has at least one other wavelength-dependent reflective (HRD) element previously connected to a different optical path of the network at a known distance from said first point at which said OTDR light is launched, and the step of comparing the first and second OTDR traces (OTDR-$\lambda_1$, OTDR-$\lambda_2$) takes into account said known distance to distinguish the peak produced by the HRD element from another peak produced by said other wavelength-dependent reflective (HRD) element.

10. A method according to claim 9, wherein, if the peak attributable to the HRD element is at least approximately coincident with said another peak, the method further comprises the step of measuring the normalized amplitude of each of the two OTDR traces (OTDR-$\lambda_1$, OTDR-$\lambda_2$) at the same position corresponding to said known distance and differentiating between the said peak and the said another peak according to the difference, if any, between the two amplitudes.

11. A method according to claim 1, wherein said one or more parameters comprise amplitude of said peak and distance between the HRD element and said first point at which said OTDR means detects the backreflected light, the method further comprising the step of determining loss of the selected optical path over said distance.

12. A method according to claim 11, wherein the normalization means of the OTDR means comprises a reference reflectance which is used to normalize said backreflected light relative to the power of the light launched into the optical path before determining said loss.

13. A method according to claim 11, wherein said loss is compared with a stored value of loss for said selected optical path, said stored value having been determined previously and stored in a memory device.

14. A method according to claim 13, wherein the previously determined and stored value of loss was obtained by the prior steps of:

using an optical time domain reflectometer (22) connected to a first point of said selected optical paths, to launch into the selected optical path at said first point light at each of said two wavelengths ($\lambda_1$) and ($\lambda_2$), to detect at said first point corresponding backreflected light as a function of time at each of said two wavelengths ($\lambda_1$,$\lambda_2$) and obtain therefrom first and second OTDR traces (OTDR-$\lambda_1$,OTDR-$\lambda_2$), respectively, each representing backreflected light as a function of optical distance, to compare the first and second OTDR traces to distinguish a peak corresponding to said HRD element from peaks corresponding to wavelength-independent localized reflectances, and to derive from said peak a value of one or more parameters of either or both of said selected optical path and said HRD element.

15. A method according to claim 1, wherein said optical network comprises a point-to-multipoint optical network having multiple optical paths whose respective first ends are connected at a common connection point to a network element (OLT), respective opposite ends of at least a plurality of said multiple optical paths being connected to a corresponding plurality of network units (ONU), respectively, each of said plurality of optical paths having connected thereto at a position at or adjacent said opposite end a respective one of a corresponding plurality of HRD elements (HRD$_C$) that are each highly-reflective at the same said one of said two predetermined wavelengths ($\lambda_1$, $\lambda_2$) and significantly less reflective at the other of said two predetermined wavelengths, the respective positions of said plurality of wavelength-dependent reflective elements relative to said common connection point being known a priori, and wherein a temporarily-connected HRD element (HRD$_S$) is to be distinguished from said plurality of HRD$_C$ elements, the temporarily-connected HRD element (HRD$_S$) being highly-reflective at said other of the two predetermined wavelengths ($\lambda_2$) and significantly less reflective at said one of the two predetermined wavelengths ($\lambda_1$), wherein the OTDR means is used to launch light at said first wavelength ($\lambda_1$) and at said second wavelength ($\lambda_2$) into said optical paths at said first point where said optical paths are commonly-connected; and wherein the step of comparing the first and second OTDR traces distinguishes localized reflective events corresponding to said plurality of HRD elements and said temporarily-connected HRD element (HRDs) from other localized reflective events resulting from wavelength-independent reflective events, and, using known positions of the plurality of HRD elements, segregates localized reflective events attributable to said plurality of HRD elements from a localized reflective event corresponding to said temporarily-connected HRD element (HRDs).

16. A method according to claim 15, wherein normalization means of said OTDR means comprises a co-located reference reflectance (R$_{REF}$) and the deriving step derives said value of said at least one parameter of said at least one selected optical path in dependence upon a difference between values of said first and second OTDR traces at the location of said localized reflective event, said values being normalized relative to said co-located reference reflector (R$_{REF}$).

17. A method according to claim 16, wherein a reflectance value of each of said plurality of HRD elements (HRD$_C$) at said first wavelength ($\lambda_1$) and a reflectance value of said temporary HRD element (HRD$_S$) at said second wavelength ($\lambda_2$) are known at least approximately, and the said one or more parameter values of said selected optical path comprise a loss of the optical path between the temporary HRD element (HRD$_S$) and the commonly-connected point at said first wavelength ($\lambda_1$).

18. A method according to claim 16, wherein the expected position of each of the said plurality of localized events on the said OTDR traces is known a priori, the said difference between the said first and second normalized OTDR traces permitting the identification of one or several of the said plurality of optical paths that may be experiencing excessive loss.

19. A method according to claim 15, wherein a reflectance value of each of said plurality of HRD elements ($HRD_C$) at said first wavelength ($\lambda_1$) and a reflectance value of said temporary HRD element ($HRD_S$) at said second wavelength ($\lambda_2$) are known at least approximately, and the said one or more parameter values of said selected optical path comprise a loss of the optical path between the temporary HRD element ($HRD_S$) and the commonly-connected point at said second wavelength ($\lambda_2$) and a loss of the optical path between the permanent HRD element ($HRD_C$) and the commonly-connected point at said first wavelength ($\lambda_2$) and wherein the loss of the optical path between the temporary HRD element ($HRD_S$) and the corresponding one of the plurality of HRD elements ($HRD_C$) connected to the same optical path is determined as the difference between the two loss measurements.

20. A method according to claim 17, in a said optical network comprising a plurality of said first reflective elements connected to a plurality of optical paths, respectively, wherein, following completion of the OTDR measurements for said different optical path, the temporary HRD element ($HRD_S$) is removed from said different optical path, installed temporarily into another of said optical paths, and the OTDR measurements from the common point repeated for said another of said optical paths.

21. A method according to claim 1, wherein said one or more parameter values are stored in a storage device together with respective identifiers for either or both of the corresponding optical path and wavelength-dependent reflective element ($HRD_C$).

22. A method according to claim 1, further comprising, following connection of the HRD element ($HRD_C$;$HRD_S$) to said optical path, the step of communicating with an entity at the OTDR end of the optical path to initiate operation of the OTDR means to perform the launching, detecting, comparing and distinguishing steps.

23. A method according to claim 22, wherein said entity is another person who operates the OTDR.

24. A method according to claim 22, wherein the entity is a computer device operable to receive the communication via a data network and initiate said OTDR measurements by said OTDR means.

25. A method according to claim 1, wherein each reflective element that is highly-reflective at said first predetermined wavelength is integrated into a network transceiver unit (ONU) installed at an end of the optical path remote from said common connection point.

26. A method according to claim 25, wherein the OTDR measurements are initiated automatically by a monitoring device at the OTDR end of the optical path.

27. A method according to claim 1, further comprising the step of outputting the value of said measured parameter to a display device or other tangible, concrete real world output means.

28. A remote control device (28) for use in the method of claim 1 to measure at least one parameter of an optical path of an optical network, the device (28) comprising a wavelength-dependent reflective element ($HRD_S$) (30) that is not highly-reflective at a first predetermined wavelength ($\lambda_1$) and highly-reflective at a second wavelength ($\lambda_2$), means (34) for connecting the reflective element ($HRD_S$) into said optical path, processor and user interface means (32) for communicating with an electronic device at a distal end of said optical path to initiate OTDR measurement of a parameter of said optical path by:

launching into said optical path light at said first wavelength ($\lambda_1$) and at said second wavelength ($\lambda_2$);

detecting corresponding backreflected light from said optical paths and obtaining therefrom first and second OTDR traces (OTDR-$\lambda_1$,OTDR-$\lambda_2$) corresponding to said first ($\lambda_1$) and second ($\lambda_2$) wavelengths, respectively, of detected backreflected light as a function of optical distance from said point;

comparing the first and second OTDR traces to distinguish a peak corresponding to said wavelength-dependent reflective element from peaks corresponding to said wavelength-independent reflective events;

deriving from said peak values of one or more parameters of either or both of said wavelength-dependent reflective element and said selected optical path; and transmitting said parameter values to said remote control device;

said processor and user interface means (32) receiving and displaying said parameter values at said remote control device (28).

29. An optical network comprising a plurality of optical paths connected at their respective first ends in common to a first network element (OLT) and at their opposite ends to a plurality of second network elements (ONU), respectively, at least some of said optical paths each having a reflective element ($HRD_C$) at a position remote from said first end thereof, each said reflective element ($HRD_C$) being strongly reflective at one of two different predetermined wavelengths and significantly less reflective at the other, neither of said two different predetermined wavelengths being a normal operating wavelength of the optical path, and OTDR measuring means connected to said first ends of said plurality of optical paths in common for launching light at two different wavelengths into said optical paths, detecting corresponding backreflected light and obtaining corresponding OTDR traces at said two different predetermined wavelengths, and comparing the OTDR traces to distinguish peaks corresponding to reflective elements ($HRD_C$) from peaks corresponding to wavelength-independent localized reflectances and deriving from at least one of said peaks a value of one or more parameters of at least one of said optical paths.

30. In a point-to-multipoint optical network, a method of using an optical time domain reflectometer (OTDR) means (22) to measure cumulative Rayleigh backscattering signal (RBS) emanating from one or more of optical paths at optical distances greater than that between the OTDR means and a wavelength-dependent reflective (HRD) element in one of said optical paths, said OTDR and said HRD element being connected to a selected optical path at respective first and second mutually-spaced points, said HRD element being highly-reflective at one of two predetermined wavelengths ($\lambda_1$,$\lambda_2$) and significantly less reflective at the other of the two predetermined wavelengths, neither of the two wavelengths corresponding to a normal operating wavelength of the optical path, wherein the reflectance and insertion loss of said HRD element at said other wavelength ($\lambda_2$) are sufficiently low that high attenuation and concomitant decay and dead zone effects attributable to said HRD element at said one wavelength ($\lambda_1$) do not significantly obfuscate any expected Rayleigh backscatter (RBS) in said backreflected light emanating from an optical distance farther from said first point than the optical distance of the said HRD element from the said first point, the method comprising the steps of:

using said optical time domain reflectometer means (22) connected to said first point of said selected optical path:
to launch into the selected optical path at said first point light at each of said two wavelengths (λ1) and (λ2),
to detect at said first point corresponding backreflected light as a function of time at each of said two wavelengths (λ1,λ2) and obtain therefrom first and second OTDR traces (OTDR-λ1,OTDR-λ2), respectively, each representing backreflected light as a function of optical distance,
to compare the first and second OTDR traces to distinguish a peak corresponding to said HRD element from peaks corresponding to wavelength-independent localized reflectances, and
to derive from said second OTDR trace a value of said RBS at said second wavelength as a function of distance.

31. A method according to claim 30, wherein at least one additional OTDR trace having said other wavelength (λ2) is acquired using OTDR settings more appropriate to Rayleigh backscatter (RBS) signal detection, the reflectance and insertion loss of one or more HRD elements at said other wavelength ($\lambda_2$) being sufficiently low that high attenuation and concomitant decay and dead zone effects attributable to said HRD element at said one wavelength ($\lambda_1$) do not significantly obfuscate any said RBS signal.

32. A method according to claim 31, wherein said OTDR settings more appropriate to RBS signal detection comprise a longer pulse width than that used in the two first acquisitions dedicated to HRD detection and measurement at λ1 and λ2.

\* \* \* \* \*